Feb. 13, 1923.
R. D. SCOTT ET AL
1,445,107
ROLLER
Filed Nov. 25, 1921
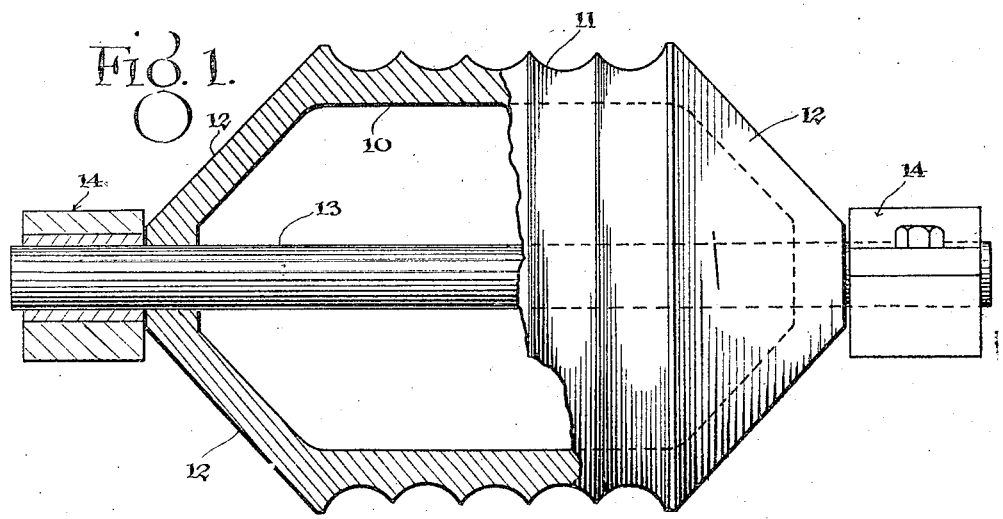
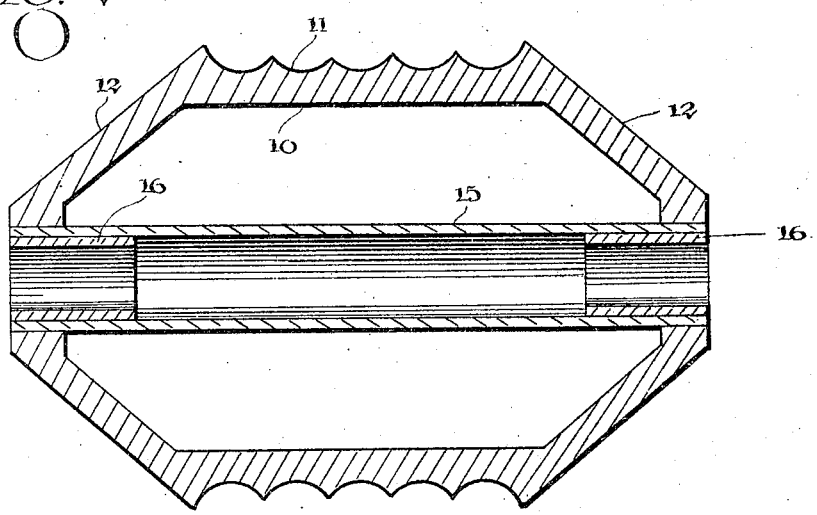
Inventors
J. G. CADWELL.
R. D. SCOTT.
WITNESSES
ATTORNEYS Patented Feb. 13, 1923.

1,445,107

UNITED STATES PATENT OFFICE.

ROBERT D. SCOTT AND JOHN G. CADWELL, OF ROSLYN, WASHINGTON.

ROLLER.

Application filed November 25, 1921. Serial No. 517,832.

*To all whom it may concern:*

Be it known that we, ROBERT D. SCOTT and JOHN G. CADWELL, citizens of the United States, and residents of Roslyn, in the county of Kittitas and State of Washington, have invented certain new and useful Improvements in Rollers, of which the following is a specification.

This invention relates to improvements in the construction of idler rollers such as employed for preventing moving ropes or cables from engaging the ground.

The object of the invention is to provide a roller of the above character of such construction that the life thereof as well as the life of the rope or cable which may engage therewith will be relatively prolonged.

It is also an important object of the invention that the roller be of such a shape that in case the rope or cable leaves the one end thereof that the same may be again easily positioned.

Other objects relating to details of construction will hereinafter appear in the detailed description to follow.

The invention is illustrated by way of example in the accompanying drawings, in which:—

Figure 1 is a perspective view illustrating a roller constructed in accordance with the present invention, with parts thereof being broken away and shown in section to more clearly illustrate the same and the roller being rotatably supported.

Figure 2 is a vertical longitudinal sectional view of a modified form of roller.

Like reference numerals refer to similar parts throughout the drawings.

Referring to the drawings more particularly, the roller in each of the forms shown consists in a hollow casting, the portion 10 of which is cylindrical in shape. The portion 10 has its outer periphery formed with a plurality of spaced grooves 11 which are semi-circular in cross section in order to receive the usual rope or cable. Each end of the roller is formed with a tapering portion 12 or more particularly with a portion which is frusto-conical in shape.

Referring to Figure 1 extending longitudinally and centrally through the roller is a shaft 13 which may be cast therewith or formed separately. The ends of the shaft extend beyond the ends of the roller to provide suitable means for rotatably supporting the roller in bearings as indicated at 14.

Referring to Figure 2 the shaft 13 shown in Figure 1 is replaced in this instance by a sleeve 15 which may be cast with the roller or formed separately as shown and having its ends secured in the roller as likewise shown. The sleeve 15 may also be provided with a bushing 16 in each of its ends in order to properly journal a shaft which may extend therethrough, and said shaft may be properly supported in any desired manner.

In each of the forms shown the purpose of the grooves 11 is to hold the rope or cable against sliding upon the surface of the roller and therefore prolong both the life of the drum and life of the rope or cable. The purpose of the tapering ends 12 is to permit the easy repositioning of the rope or cable in case the same should leave the drum during winding or rewinding. It is thought that the importance of this advantage is obvious.

We claim:—

1. A roller of the character described, comprising a cylindrical casting having each end tapered and the portion intermediate said tapered ends formed with a plurality of annular grooves arranged longitudinally of the casting.

2. A roller of the character described comprising a cylindrical casting having tapered ends, a sleeve extending centrally and longitudinally therethrough in which a supporting shaft for said roller may be journaled, and a plurality of grooves formed about the cylindrical portion of said casting and arranged longitudinally thereof and each groove being semi-circular in cross section and adapted to receive a cable or rope.

3. A roller of the character described comprising a cylindrical casting having tapered ends, a sleeve extending centrally and longitudinally therethrough in which a supporting shaft for said roller may be journaled, a bushing within each end of said sleeve, and a plurality of grooves formed about the cylindrical portion of said casting and arranged longitudinally thereof and each groove being semi-circular in cross section and adapted to receive a cable or rope.

ROBERT D. SCOTT.
JOHN G. CADWELL.